(12) United States Patent
Piehler

(10) Patent No.: US 6,873,470 B2
(45) Date of Patent: Mar. 29, 2005

(54) ARRANGEMENT FOR THE VISUALIZATION OF INFORMATION IN A MOTOR VEHICLE

(75) Inventor: Eberhard Piehler, Lehesten (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/715,088

(22) Filed: Nov. 17, 2003

(65) Prior Publication Data

US 2004/0100420 A1 May 27, 2004

(30) Foreign Application Priority Data

Nov. 19, 2002 (DE) .......................................... 102 53 729

(51) Int. Cl.$^7$ ........................ G02B 27/12; G02B 13/00; G09G 5/00
(52) U.S. Cl. ............................ 359/630; 359/599; 345/7
(58) Field of Search ................................ 359/630–634, 359/495–496, 566–567, 599, 625–627, 742–743, 13, 466; 345/7–9

(56) References Cited

U.S. PATENT DOCUMENTS

| 5,694,230 A | * | 12/1997 | Welch ........................ 359/13 |
| 6,456,260 B1 | * | 9/2002 | Koenig et al. ................. 345/7 |
| 2002/0021500 A1 | * | 2/2002 | Furuya ....................... 359/630 |

FOREIGN PATENT DOCUMENTS

DE     197 51 649     11/1997

\* cited by examiner

*Primary Examiner*—Georgia Epps
*Assistant Examiner*—Alicia M. Harrington
(74) *Attorney, Agent, or Firm*—Reed Smith LLP

(57) ABSTRACT

The invention is directed to an arrangement for the visualization of information in a motor vehicle, comprising wherein an optical device for projecting at least one display image for forming a virtual image in front of or in an area of a windshield of the vehicle, wherein microchips such as DMDS or LCOs are used as image-generating elements. According to the invention, an apparatus for splitting the light flow into partial light flows is provided for the purpose of illuminating the pupil plane.

14 Claims, 1 Drawing Sheet

ARRANGEMENT FOR THE VISUALIZATION OF INFORMATION IN A MOTOR VEHICLE

CROSS-REFERENCE TO RELATED APPLICATION

This application claims priority of German Application No. 102 53 729.1, filed Nov. 19, 2002, the complete disclosure of which is hereby incorporated by reference.

BACKGROUND OF THE INVENTION

1. Field of the Invention

The invention is directed to an arrangement for the visualization of information in a motor vehicle, comprising an optical device for projecting at least one display for forming a virtual image in front of or in an area of a windshield of the vehicle, wherein microchips such as DMDs or LCOs are provided as image-generating elements.

2. Description of the Related Art

It is generally known to use head-up display devices in motor vehicles. These devices project information supplied by a display device onto a projection surface in front of the driver's seat so that a virtual image of this display is formed in front of the windshield. A solution of this type is described, for example, in DE-OS 197 51 649 A1.

These devices usually have a projector which projects the light emitted by the display against the windshield. The windshield acts as a combiner, reflects the light, and provides a virtual image in front of the windshield which is visible to the driver.

The essential advantage of displays of the type mentioned above consists in that the apparent position of the information data lies in an area that is perceived by the driver without the driver having to look away from the road or focus over a short distance.

A virtual image which is formed in front of the driver's eye at a distance of 2.5 m to 3 m, for example, should fill an approximate viewing angle of 6 to 12 degrees horizontally and should be visible to both eyes.

Microchips such as DMDs or LCOs are used increasingly in image generation. Formats of 10 mm width with a numerical aperture of 0.2 (about 12 degrees) are customary. When a virtual image is viewed at a distance of 3 m in an image field of 6 to 12 degrees, there is an image extension of 315 to 630 mm. Based on the assumed aperture of the chips, a pupil diameter of 40 to 20 mm would result at the location of the eye. This means that a sufficiently large pupil area can not be illuminated when using the most common microchips as image-generating elements, so that the virtual image is not perceived simultaneously by both eyes.

Aside from the problem of illuminating a sufficiently large pupil area, arrangements of the type mentioned above have the disadvantage that the optical device for generating the image field and illuminating the pupil area is very large because relatively large distances must be covered between the optical device and the eye of the driver.

Proceeding from the disadvantages described above, it is the object of the invention to further develop an arrangement for the visualization of information in a motor vehicle in such a way that a pupil area which is sufficiently large for both eyes to perceive the virtually generated image of the information is illuminated while minimizing the elements of the optical device.

SUMMARY OF INVENTION

According to the invention, this object is met by an arrangement of the type described above in that an intermediate imaging is realized for the purpose of illuminating a sufficiently large pupil plane and a diffusion screen which enlarges the radiating angle is arranged in the intermediate image plane and/or an apparatus for splitting the light flow into partial light flows is located between the optical device and the pupil plane, wherein the apparatus for splitting the light flow is advisably designed in such a way that a first partial light flow is associated with the left eye and a second partial light flow is associated with the right eye.

The etendue or light conducting value is changed by the intermediate imaging of the information and the arrangement of a diffusion screen in the intermediate image plane, and a larger pupil area is accordingly illuminated by the additional imaging with the virtual image size remaining the same.

The diffusion screen is advantageously constructed in such a way that it radiates the light differently in the two orthogonal directions. Therefore, the pupil obtains an elliptic shape and is better adapted to an illuminated pupil area determined by both eyes.

Due to the splitting of the light flow into two partial light flows by an element arranged between the optical device and the pupil plane, each partial light flow being associated with one eye, a highly effective illumination of both eye pupils is achieved. The virtual image is formed for the two eyes at different locations by simple splitting. This can be corrected in that corresponding deflecting elements are arranged in the beam paths of the partial light flows for renewed, desired deflection.

The apparatus for splitting the light flow can be constructed so as to be transmissive and/or reflective.

A possible variant for splitting the light flow consists in the arrangement of an optical grating (transmissive or reflective).

Further, advantageous constructions consist in that either a transmissive optical element with a Fresnel structure is located in front of the pupil plane, wherein the splitting into partial light flows is carried out by means of the flanks of the Fresnel structure, or a reflective Fresnel structure or reflective polarization-optical element is provided for splitting the light flow.

The use of a polarization-optical element has proven advantageous insofar as a deflection adapted for the two partial light flows can also be carried out at a location where the partial light flows still penetrate.

The reflective polarization-optical element can be, e.g., an optical wedge, and the light flow entrance surface has a polarizing splitter layer at which the first partial light flow is reflected at an angle $\alpha$ to the incident direction in the pupil plane, and the second light flow which enters into the wedge and strikes the reflecting wedge surface located opposite the light entrance surface reaches the pupil plane by reflection at an angle $\beta$ to the incident direction. Angles $\alpha$ and $\beta$ are dependent on the wedge angle, so that the location of the impinging partial light flows can be determined by changing the wedge angle.

For the purpose of directional orientation of the partial light flows, it is useful to provide optically refracting deflecting elements in the beam paths because the size of the imaging optics can be minimized in this way.

Further, an advantageous construction of the arrangement according to the invention consists in that a deflecting element by means of which the partial light flows are reflected into the eye pupils is located in the upper area of the windshield approximately at the height of the interior rearview mirror. In this arrangement, the eye need only be turned away very slightly from the road for receiving information. The use of deflecting elements with refractive power at this location has a favorable effect on the structural size of the total imaging unit.

Another advantageous construction of the arrangement according to the invention consists in that a device for homogenizing the pupil illumination is integrated in the illumination part. The lamps used for projectors have an uneven intensity distribution along the angles (in elliptic reflectors) or along the height of the axis of symmetry (in parabolic reflectors) which results in an uneven energy distribution in the pupil and, consequently, as the eye moves within the illuminated pupil, leads to differences in brightness in the perception of the virtual image. This shortcoming can be overcome by means of a corresponding device, for example, a diffusion screen within an integrator that is provided for uniform illumination of the image field.

The arrangement according to the invention will be described more fully with reference to an embodiment example.

DESCRIPTION OF THE PREFERRED EMBODIMENTS

Figure 1:
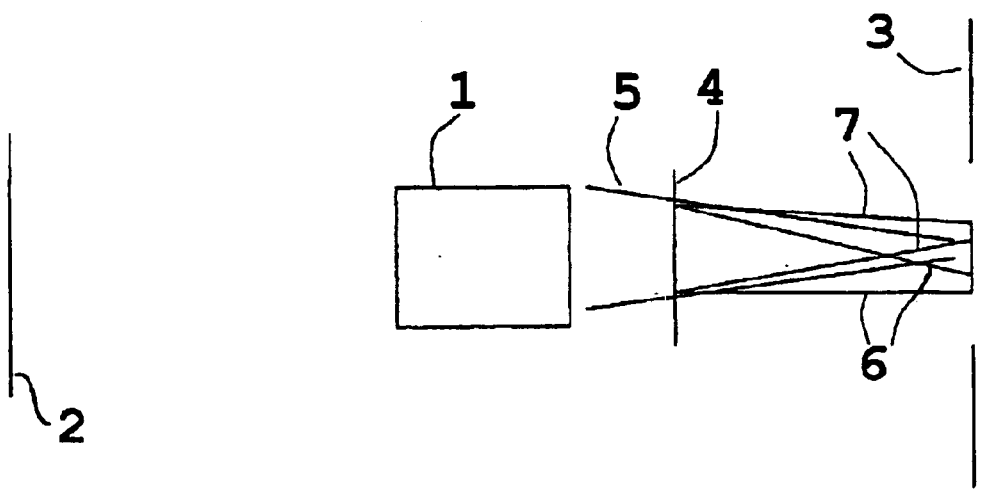
FIG. 1 is a schematic view of the arrangement for splitting the light flow (transmissive)

FIG. 1 shows a simplified view of the arrangement, according to the invention, for the visualization of information in a motor vehicle with an optical device 1. The optical device 1 projects the information received by image-generating microchips such as DMDs or LCOs onto the front windshield of a motor vehicle and generates a virtual image on the projection plane 2.

A transmissive optical element 4 is located between the optical device 1 and the pupil plane 3. This transmissive optical element 4 splits the wedge-shaped beam path 5 (light flow) proceeding from an objective, not shown in more detail, of the optical device 1 into two partial light flows 6 and 7, each of which is associated with one of the driver's eyes.

The splitting of the light flow 5 into two partial light flows 6 and 7 makes it possible for the virtual image of the transmitted information to be perceived by both eyes.

Figure 2:
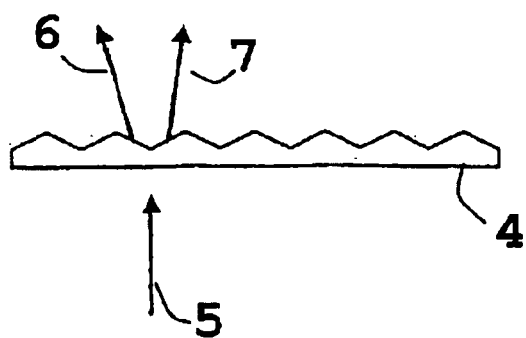
FIG. 2 is a schematic view of the splitting of the light flow by means of an element with a Fresnel structure (transmissive)

FIG. 2 shows an embodiment form of the transmissive optical element 4 with a Fresnel structure. The splitting of the light flow 5 into two partial light flows 6 and 7 is carried out by means of the flanks of the Fresnel structure.

Figure 3:
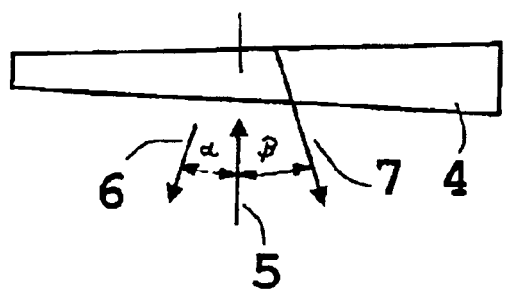
FIG. 3 is a schematic view of the splitting of the light flow by means of a polarization-optical element (reflective).

Another optical element 4 (reflective) is shown in FIG. 3. The optical element 4 comprises a polarization-optical wedge, wherein the light entrance surface 8 is provided with a polarization layer, not shown in more detail. The portion of the light flow 5 not penetrating into the optical element 4 is reflected into the partial light flow 6 at an angle α to the incident direction. The surface 9 of the optical element 4 located opposite the light entrance surface 8 is constructed so as to be reflecting (mirror surface), so that the proportion of the light flow 5 penetrating into the optical element 4 is reflected at the surface 9 and exits the optical element 4 again at an angle β as partial light flow 7. Angles α and β can be changed through the refractive power of the optical element 4 and through the wedge angle between the surfaces 8 and 9.

While the foregoing description and drawings represent the present invention, it will be obvious to those skilled in the art that various changes may be made therein without departing from the true spirit and scope of the present invention.

REFERENCE NUMBERS 1 optical device
2 projection plane
3 pupil plane
4 optical element
5 light flow
6,7 partial light flows
8,9 surface
α,β angles

What is claimed is:

1. An arrangement for the visualization of information in a motor vehicle, comprising:

an optical device for projecting at least one display image for forming a virtual image in front of or in an area of a windshield of the vehicle, wherein microchips such as DMDS or LCOs are provided as image-generating elements, and wherein an intermediate imaging is realized for the purpose of illuminating the pupil plane; and a diffusion screen which enlarges the radiating angle being arranged in the intermediate image plane and/or an apparatus for splitting the light flow into partial light flows being located between the optical device and the pupil plane, wherein a partial light flow is associated with the left eye and a partial light flow is associated with the right eye.

2. The arrangement for the visualization of information in a motor vehicle according to claim 1, wherein the diffusion screen has a different radiating characteristic in the two orthogonal directions.

3. The arrangement for the visualization of information in a motor vehicle according to claim 1, wherein a deflecting element is provided for the purpose of mirroring the partial light flows into the pupil plane.

4. The arrangement for the visualization of information in a motor vehicle according to claim 1, wherein the apparatus for splitting the light flow is constructed so as to be transmissive and/or reflective.

5. The arrangement for the visualization of information in a motor vehicle according to claim 1, wherein an optical grating is provided for the purpose of splitting the light flow.

6. The arrangement for the visualization of information in a motor vehicle according to claim 1, wherein a transmissive or reflective optical element with a Fresnel structure is arranged in front of the pupil plane, wherein the splitting into partial light flows is carried out by means of the flanks of the Fresnel structure.

7. The arrangement for the visualization of information in a motor vehicle according to claim 1, wherein a reflective polarization-optical element is provided for splitting the light flow into partial light flows.

8. The arrangement for the visualization of information in a motor vehicle according to claim 7, wherein the reflective polarization-optical element is a wedge, and the light flow entrance surface has a polarizing splitter layer at which the first partial light flow is reflected at an angle α to the incident direction in the pupil plane, and the second light flow which enters into the wedge and strikes the reflecting wedge surface located opposite the light entrance surface reaches the pupil plane by reflection at an angle $\beta$ to the incident direction.

9. The arrangement for the visualization of information in a motor vehicle according to claim 1, wherein optically refracting deflecting elements are provided in the beam paths for the purpose of directional orientation of the partial light flows.

10. The arrangement for the visualization of information in a motor vehicle according to claim 1, wherein the element for splitting the light flow for one or both partial light flows has a focussing or dispersing effect.

11. The arrangement for the visualization of information in a motor vehicle according to claim 1, wherein one or more optical components are provided for the purpose of directional orientation of the partial light flows, so that the virtual image appears at the same location for both eyes.

12. The arrangement for the visualization of information in a motor vehicle according to claim 11, wherein the elements for directional orientation of the partial light flows have a focusing or dispersing effect.

13. The arrangement for the visualization of information in a motor vehicle according to claim 1, wherein a device for homogeneous illumination of the pupil plane is provided in the illumination arrangement of the microchip.

14. The arrangement for the visualization of information in a motor vehicle according to claim 13, wherein the device for homogeneous illumination of the pupil plane is a diffusion screen.

* * * * *